United States Patent [19]
Carver et al.

[11] Patent Number: 6,009,838
[45] Date of Patent: Jan. 4, 2000

[54] HIBERNATION ENCLOSURE FOR REPTILES

[76] Inventors: Jae Carver; Kenneth Carver, both of 12226 Hartsook St., Valley Village, Calif. 91607

[21] Appl. No.: 09/106,986

[22] Filed: Jun. 29, 1998

[51] Int. Cl.⁷ ..................................................... A01K 1/03
[52] U.S. Cl. .......................... 119/500; 119/421; 119/452; 47/69; 62/229; 62/231
[58] Field of Search ..................................... 119/452, 482, 119/417, 421, 246, 500, 501, 418, 419; 47/69; 62/229, 231

[56] References Cited

U.S. PATENT DOCUMENTS

| | | | |
|---|---|---|---|
| 3,643,459 | 2/1972 | Matthies | 62/321 X |
| 3,786,781 | 1/1974 | Poulsen | 119/246 |
| 4,154,196 | 5/1979 | Gass | 119/417 |
| 4,201,153 | 5/1980 | Nace | 119/224 |
| 4,234,780 | 11/1980 | McCarthy | 219/200 |
| 4,384,461 | 5/1983 | Kurtz | 62/231 X |
| 4,850,198 | 7/1989 | Helt et al. | 62/231 X |
| 4,939,911 | 7/1990 | Mandell | 62/239 |
| 5,010,845 | 4/1991 | Azpurua | 119/452 |
| 5,031,412 | 7/1991 | Efron et al. | 62/231 X |
| 5,081,955 | 1/1992 | Yoneda et al. | 119/417 |
| 5,134,969 | 8/1992 | Mason | 119/472 |
| 5,213,059 | 5/1993 | Krantz | 119/419 |
| 5,272,316 | 12/1993 | Chesnut | 219/385 |
| 5,343,712 | 9/1994 | Gowan | 62/229 X |
| 5,557,941 | 9/1996 | Hanson et al. | 62/229 X |
| 5,802,863 | 9/1998 | Cowans | 62/229 X |
| 5,809,936 | 9/1998 | Wall | 119/484 |
| 5,887,436 | 3/1999 | Duddleston | 62/3.62 |
| 5,899,084 | 5/1999 | Franaszek et al. | 62/229 X |

*Primary Examiner*—Michael I. Carone
*Assistant Examiner*—James S. Bergin
*Attorney, Agent, or Firm*—Goldstein & Canino

[57] ABSTRACT

A hibernation enclosure comprising an insulated cabinet and a cooling device to effect cooling and maintain temperature therein at selected temperature values. A control unit is operatively connected to the cooling device having a thermostat for selectively switching the cooling device on and off according to preselected temperature values and the current temperature within the hibernation enclosure. The control unit is programmable, having a control panel to allow a user to program the hibernation length, and to program temperature values that may vary throughout the duration of the hibernation period in accordance with the needs of the particular caged reptile. The hibernation enclosure further comprises a humidifier to maintain optimal humidity for the hibernating reptile and a motion sensor located within the walls of the cabinet to detect movement by the caged animal in order to alert a caretaker that the hibernating reptile is withdrawing prematurely from the hibernation.

1 Claim, 3 Drawing Sheets

6,009,838

HIBERNATION ENCLOSURE FOR REPTILES

BACKGROUND OF THE INVENTION

This invention relates to animal cage enclosures. More particularly, the invention relates to a hibernation enclosure which is designed to provide a controlled environment suitable for enabling reptiles to enter into hibernation.

Many reptiles in the wild spend the cold winter months in hibernation. Hibernation is a state of greatly reduced metabolism characterized by a lowering of body temperature and the rate of breathing. Maintaining a low rate of metabolism during hibernation is not only important for surviving the harsh winters, but is also important for overcoming diseases and ensuring successful breeding. Accordingly, in order to raise healthy reptiles and gain benefits from successful breeding, it is necessary to replicate their natural environment as much as possible. Thus, it is desirable to have an animal cage enclosure that can simulate winter climate conditions, as would be experienced by the caged reptiles if they were living in the wild, and thereby enable them to safely enter into hibernation.

Several references uncovered in the prior art describe animal cages that provide a controlled environment suitable for particularly accommodating cold-blooded animals such as reptiles. Such prior art animal cages are disclosed in U.S. Pat. Nos. 5,010,845, 5,134,969, 5,272,316, 3,786,781, and 4,201,153. Despite the importance of hibernation, most of these prior art animal cages lack the ability to accommodate the hibernation needs of the caged animals.

While these units mentioned above may be suitable for the particular purpose employed, or for general use, they would not be as suitable for the purposes of the present invention as disclosed hereafter.

SUMMARY OF THE INVENTION

It is an object of the invention to provide a hibernation enclosure which is capable of providing a controlled environment in accordance with the hibernation needs of a particular reptile.

It is another object of the invention to provide a hibernation enclosure which allows the user to program the hibernation length, temperature values during various times of the hibernation period, and humidity level to ensure that the caged reptile will receive optimal benefits from the hibernation.

It is yet another object of the invention to provide a hibernation enclosure which is designed to gradually reduce its interior temperature to encourage the caged reptile to safely enter into hibernation.

It is a further object of the invention to provide a hibernation enclosure which employs motion sensors to alert the user in response to the detection of movement by a caged reptile so that an appropriate action can be taken when the reptile has withdrawn prematurely from the hibernation.

The invention is a hibernation enclosure comprising an insulated cabinet and a cooling device to effect cooling and maintain temperature therein at selected temperature values. A control unit is operatively connected to the cooling device having a thermostat for selectively switching the cooling device on and off according to preselected temperature values and the current temperature within the hibernation enclosure. The control unit is programmable, having a control panel to allow a user to program the hibernation length, and to program temperature values that may vary throughout the duration of the hibernation period in accordance with the needs of the particular caged reptile. The hibernation enclosure further comprises a humidifier to maintain optimal humidity for the hibernating reptile and a motion sensor located within the walls of the cabinet to detect movement by the caged animal in order to alert a caretaker that the hibernating reptile is withdrawing prematurely from the hibernation.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
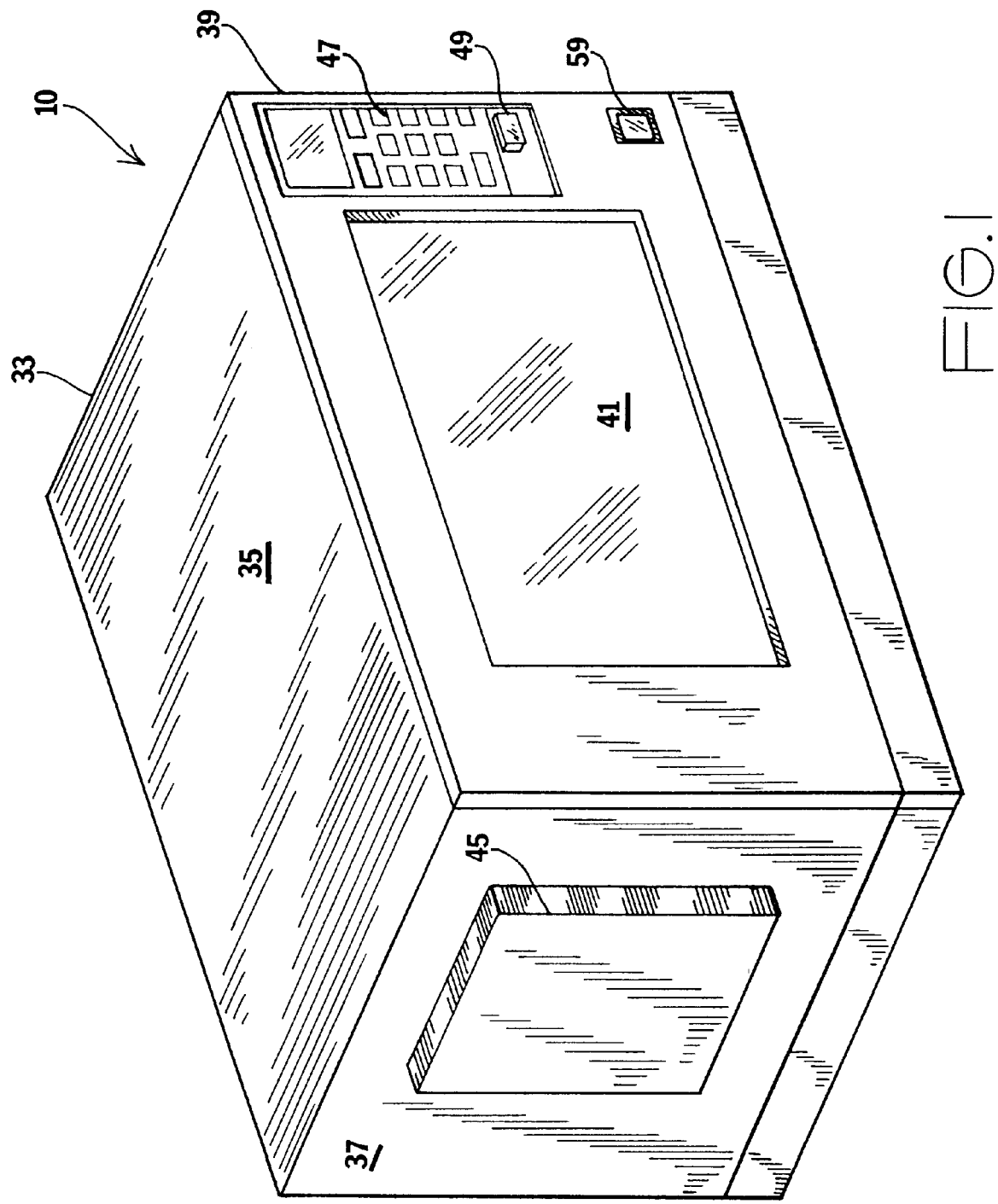
FIG. 1 is a diagrammatic perspective view of a preferred embodiment of a hibernation enclosure in accordance with the principles of the present invention.

FIG. 1 illustrates a preferred embodiment of a hibernation enclosure 10 for reptiles in accordance with the principles of the present invention. As will be seen in following paragraph, the hibernation enclosure 10 of the present invention is designed to provide a controlled environment in accordance with the hibernation needs of reptiles.

Figure 2:
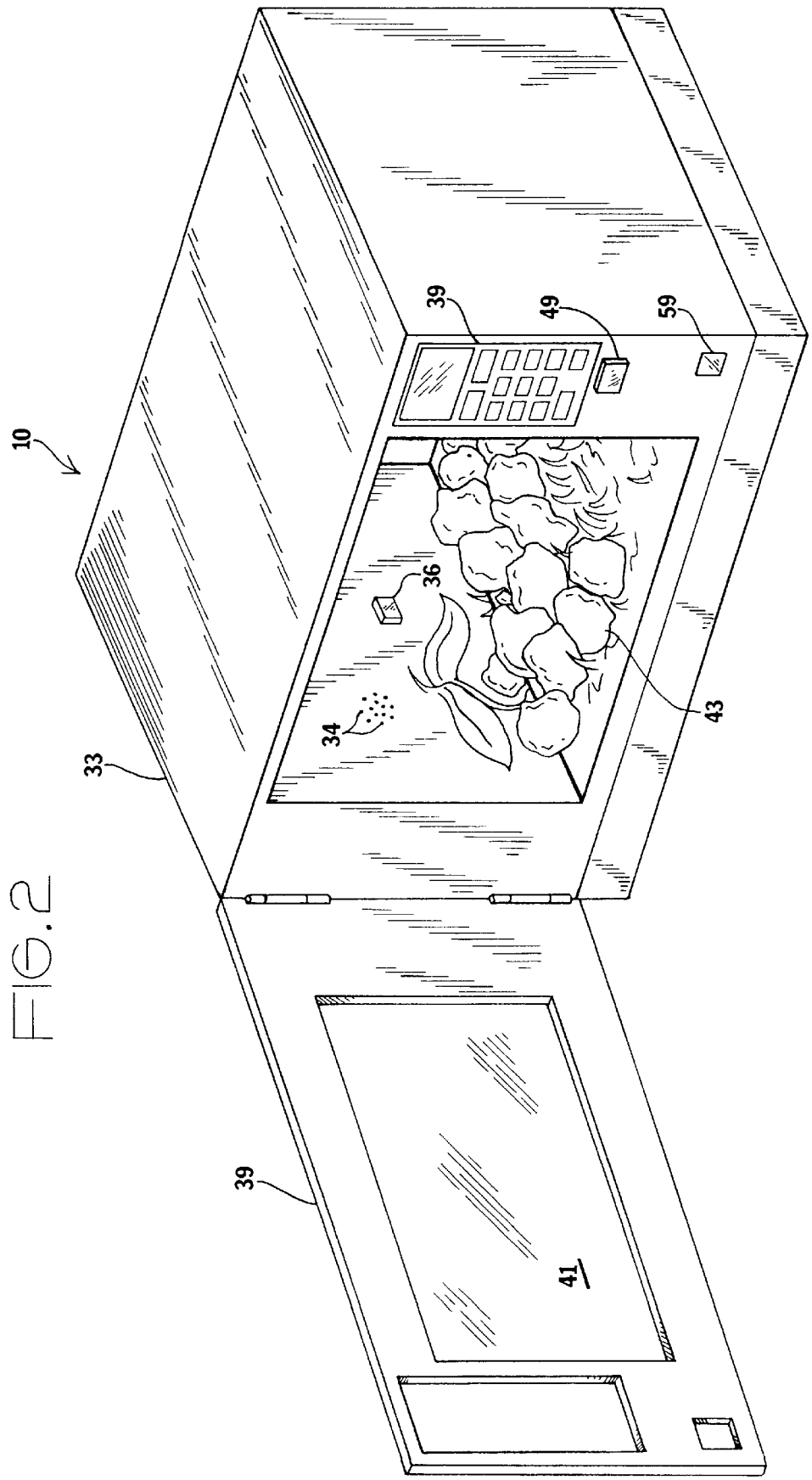
FIG. 2 is a diagrammatic perspective view of the hibernation enclosure with its front door in an open position.

The hibernation enclosure 10 includes a cabinet 33 defined by a back wall, a top wall 35, a bottom wall, and side walls 37, which are all insulated to prevent thermal energy transfer between the interior of the cabinet and the outside environment. The front of the cabinet 33 is open to permit reception of reptiles and the like. As seen by referring to FIG. 2, the cabinet includes a front door 39 swingably mounted to the cabinet 33 for closing the open front of the cabinet, which is equipped with a door button 59 for releasing a door latch to permit opening thereof. The front door 39 includes a one-way viewing window 41 for enabling the caretaker of the caged reptile to determine its hibernation status without the necessity of opening the front door 39. The interior of the cabinet 33 is preferably arranged with rocks, plants, and the like 43 to provide a suitable setting for a particular breed of reptile. The cabinet 33 is provided with ventilation holes 34 which are fitted with air filter media 45 to slowly circulate fresh air into the cabinet, as depicted in FIG. 1.

Figure 3:
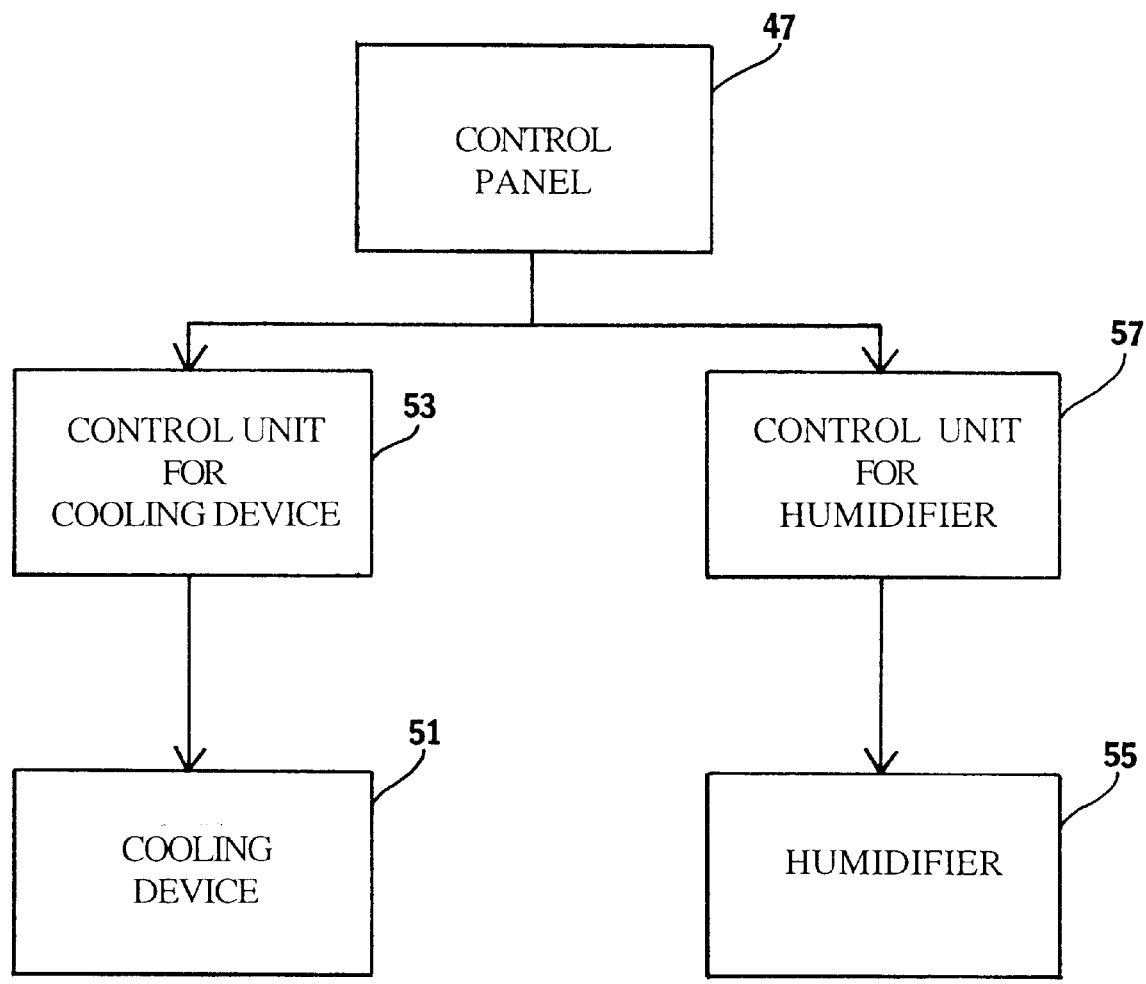
FIG. 3 is a block diagram of the preferred embodiment of the hibernation enclosure of the present invention.

FIG. 3 schematically illustrates the hibernation enclosure 10 provided with a cooling device 51 of any suitable type to effect cooling and maintain temperature within the hibernation enclosure 10 at preselected temperature values. The cooling device 51 of the present invention is preferably of type well known to persons of ordinary skill in the art and its specific design or configuration forms no part of the present invention. The hibernation enclosure 10 is equipped with a control panel 47 to allow the user to program the length of hibernation period, and to program temperature values that vary throughout the duration of the hibernation period in accordance with the needs of the reptile. The temperature values may be programmed to vary, for example, day by day, to ensure that the temperature within the hibernating enclosure changes gradually. The preselected temperature values are used to automatically control the temperature within the hibernation enclosure 10 to be maintained in accordance with programmed temperature values during various times of the hibernation period. A control unit 53 for the cooling device 51 is operatively connected to the cooling device 51 having a thermostat for selectively switching the cooling device 51 on and off according to the preselected temperature values and the current temperature within the hibernation enclosure.

The hibernation enclosure 10 of the present invention is preferably equipped with a humidifier 55 of any suitable type to maintain an optimal humidity level for the hibernating reptile. The control panel 47 of the present invention may be made to allow the user to program humidity levels that vary throughout the duration of the hibernation period in accordance with the needs of the reptile. A control unit for the humidifier 57 is operatively coupled to the humidifier 55 having a humidistat for selectively switching the humidifier on and off according to the preselected humidity levels and the current humidity within the hibernation enclosure.

The hibernation enclosure 10 may also include one or more motion sensors 36 located within the walls of the cabinet 33 to detect movements by the caged animal indicative of the animal withdrawing from the hibernation. To alert the owner of the caged animal that the hibernating animal is withdrawing prematurely from the hibernation, an alarm 49 is electrically connected to the motion sensor 36 such that the alarm 49 is activated in response to the detection of the movements by the animal.

The operation of the hibernation enclosure 10 will now be described. As the time to hibernate arrives, a reptile is placed inside the hibernation enclosure 10. The length of hibernation period, the temperature values during various times of the hibernation period, and the level of humidity are selected in accordance with the needs of the caged reptile to ensure that the reptile will receive optimal benefits from hibernation. In most cases, the user would preselect the temperature values such that the temperature within the enclosure will gradually be lowered until it reaches a lowest preselected temperature value. The lowering of the temperature within the enclosure encourages the caged reptile to hibernate, causing it to become sluggish. As the temperature inside the enclosure approaches the lowest preselected temperature valve, the reptile will gradually become dormant. Typically, the lowest preselected temperature value will be maintained during substantial part of the hibernation period so that the reptile can remain in its dormancy state. At the end of the hibernation period, the temperature will rise slowly and the level of humidity will be adjusted to the normal condition.

Many specific details contained in the above description merely illustrate some preferred embodiments and should not be construed as a limitation on the scope of the invention. Many other variations are possible.

What is claimed is:

1. A hibernation enclosure for reptiles, comprising:

a) a cabinet having an interior for housing at least one reptile;

b) a door swingably mounted to the cabinet and a one-way viewing window mounted to said door for enabling a user to determine the status of the reptile without the necessity of opening said door;

c) cooling means to effect selective cooling of the interior of said cabinet;

d) ventilation holes and an air filter fitted over the ventilation holes to circulate a controlled amount of fresh air into the cabinet;

e) a motion sensor for detecting movements by the reptile, and an alarm electrically connected to said motion sensor such that the alarm is activated in response to the detection of movements indicative of the reptile withdrawing from hibernation;

f) a humidifier to maintain an optimal humidity level for the reptile;

g) a control unit operatively connected to said cooling means having a thermostat for selectively switching said cooling means on and off according to preselected temperature values and the current temperature within said cabinet; and h) wherein said preselected temperature values are selected to gradually change the temperature within the cabinet from a normal temperature to a lowest preselected temperature value to encourage said reptile to enter into hibernation, to maintain said lowest preselected temperature during a substantial part of the hibernation period, and to gradually raise the temperature within the container to the normal temperature, as the end of the hibernation period approaches.

* * * * *